Aug. 28, 1923.                                           1,465,959
W. A. WINTER
FUR TREATING MACHINE
Original Filed Sept. 18, 1919     2 Sheets-Sheet 1
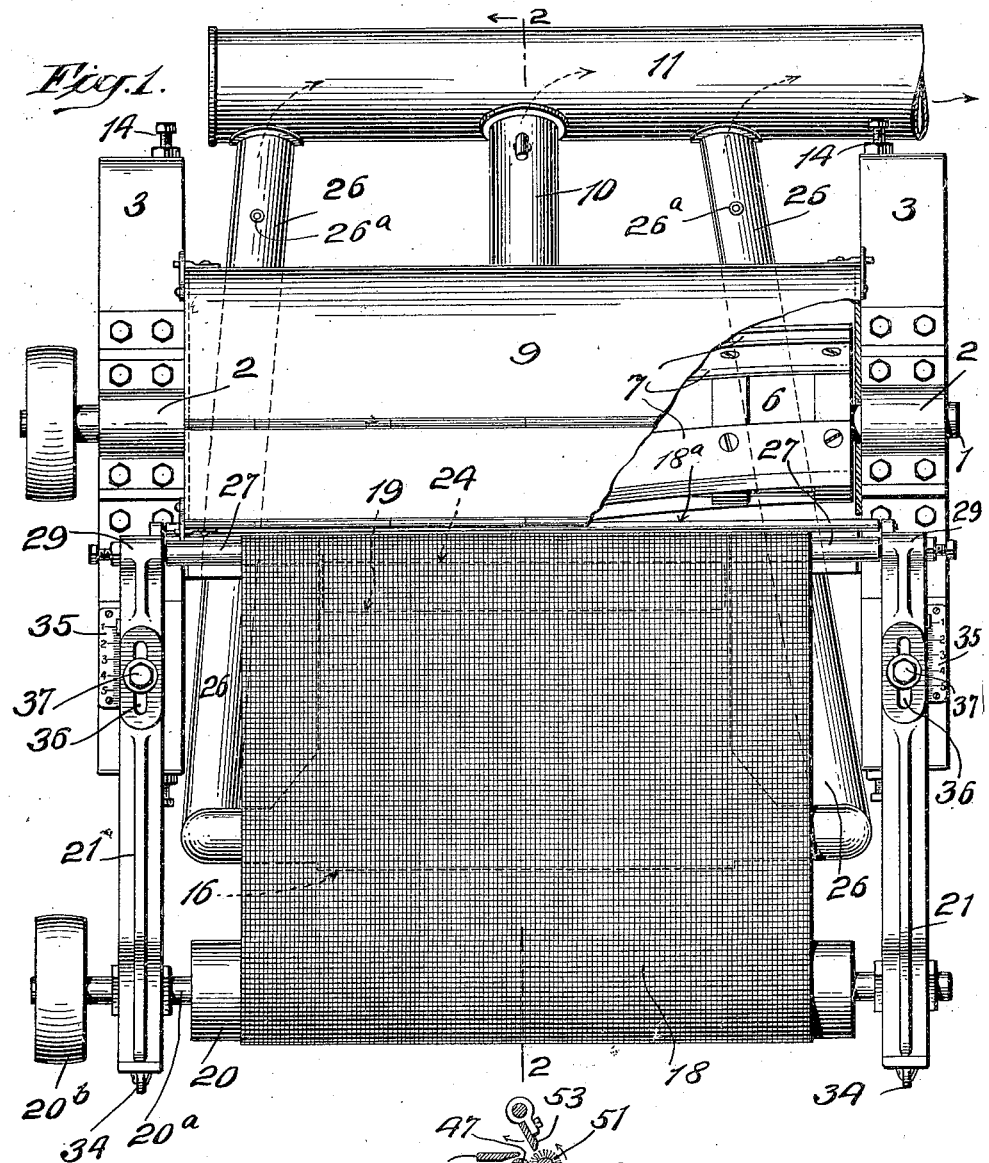
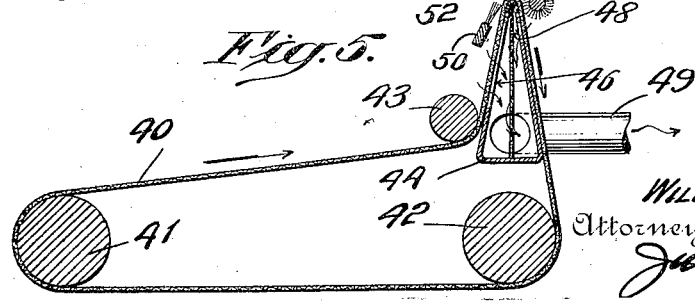
Inventor
WILLIAM A. WINTER
Attorney

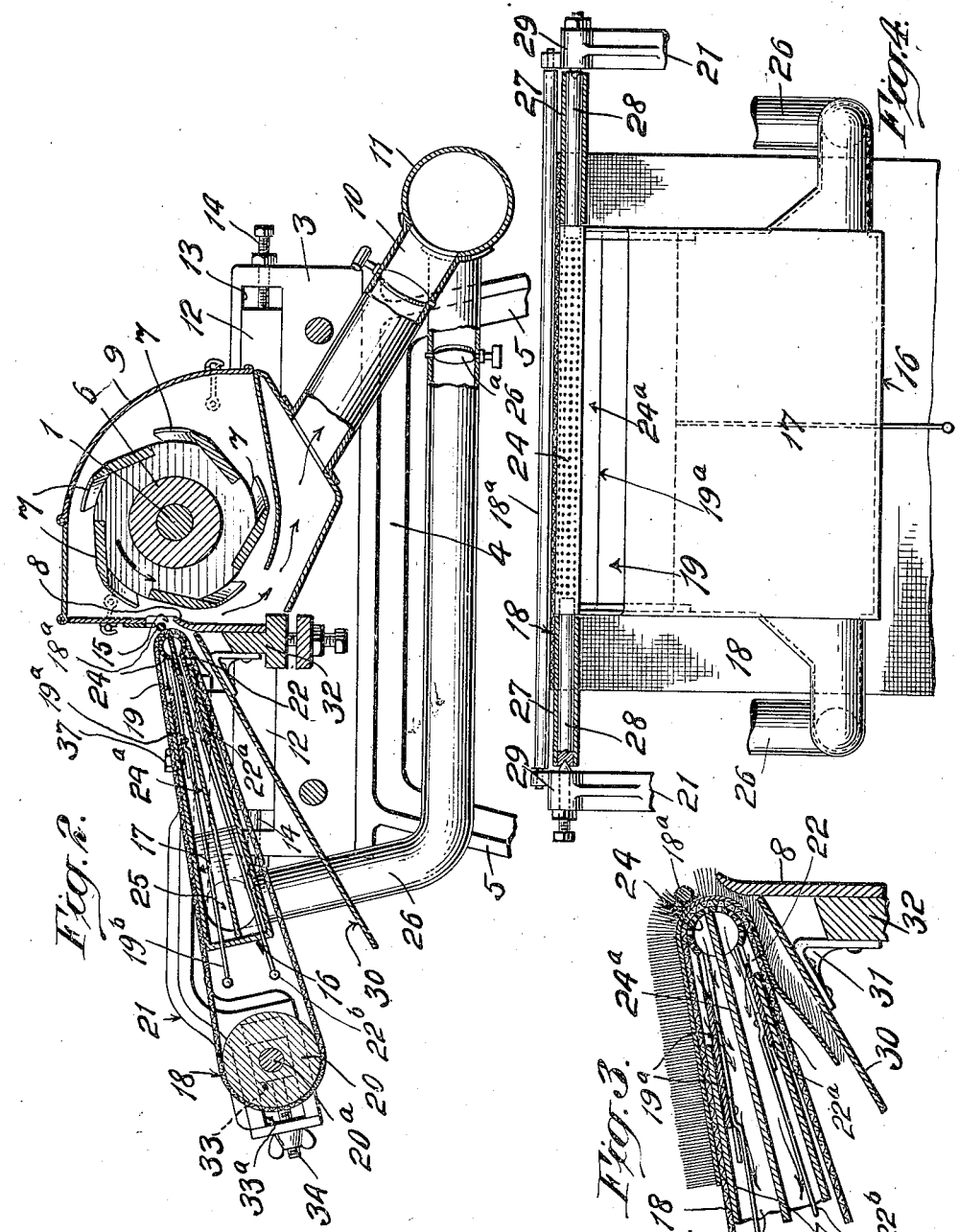

Patented Aug. 28, 1923.

1,465,959

UNITED STATES PATENT OFFICE.

WILLIAM A. WINTER, OF NEW YORK, N. Y.

FUR-TREATING MACHINE.

Application filed September 18, 1919, Serial No. 324,428. Renewed September 15, 1921. Serial No. 500,954.

*To all whom it may concern:*

Be it known that I, WILLIAM A. WINTER, a citizen of the United States, and a resident of the borough of Bronx, county of Bronx, city and State of New York, have invented certain new and useful Improvements in Fur-Treating Machines, of which the following is a specification.

This invention relates to improvements in fur treating machines.

In machines of this character, one or a series of fur-bearing skins were heretofore usually moved or fed into and through the operating zone of shearing cutters by pinning such skins by hand to a conveyor belt which fed or carried the same forwardly over a support and then in an arc into and through the zone of operation of shearing cutters or the like and then rearwardly below the table to the front of the machine where the skins were released from the belt by the operator.

One object of my invention is to accomplish this feeding or movement of skins through such operating zone by such a conveyor belt and support combined with means for automatically and firmly attaching to the said belt the under skin surface of such fur-bearing skins as it approaches the zone of operation of the cutters, retaining the same in close association with the belt during its movement through said zone and then automatically releasing the skins during the backward travel of the belt, whereby the skins may be caused to travel with the belt in attachment therewith first in one direction, then in the arc of a circle through the shearing or treating zone and back in the opposite direction a part of the distance travelled by the belt, when the same is automatically released from engagement with the belt.

Another object is to provide means whereby the skins are conveyed, preferably by gravity, from the point at which the same are released from the belt to the front of the machine.

Another object of my invention is to procure the aforesaid automatic attachment and releasing of the under surface of the skins to and from the travelling belt by means of a stationary air-suction or vacuum-producing device located in or below the support, and the use in combination with such an air-suction or vacuum-producing device of a porous belt preferably formed of a metallic chain.

Another object of my invention is to provide in combination with a vacuum-producing device adapted to create a suction at portions of the upper, front and lower surfaces of a belt-supporting table, a metallic chain belt driven in contact with the upper surface of said belt-supporting table, over the front edge thereof and along the under surface of the same whereby a skin may be carried by the belt over a portion of the upper surface of the table around said front edge in the arc of a circle and then may be automatically released at a suitable point beneath the table, whereby the skins may be carried into the zone of operation of shearing cutters or other suitable devices for operating on the fur of the skin.

In the preferred embodiment of my invention I provide a suitable belt-supporting table, a conveyor belt composed of a porous material and preferably of a metallic chain like material travelling in contact with said supporting table over and below the same and around the front edge thereof, driving means for said belt at the rear of said supporting table, a rounded guiding edge at the forward side of said supporting table, suction openings of less width than the said belt contiguous to said guiding edge above and below the same and a series of suction apertures in said guiding edge and rollers at opposite sides of said suction openings whereby a skin or the like may by the travel of the belt over the belt-supporting table be carried over the suction apertures in the said table so as to be initially and firmly attached to the belt and thereafter to be moved in the arc of a circle around the forward edge of said belt-supporting table and into operative relationship with cutters or like devices for treating the skins, and will then furthermore be moved downwardly around the said forward or treating edge and rearwardly a suitable distance while being so held and acted upon by suction; after which the conveyor belt, because of its travel beyond the suction zone, automatically causes the release of the fur skin whereupon it drops onto an inclined chute or board by which it is conducted to the front of the machine.

Other objects of my invention will be in part obvious from the annexed drawings and in part indicated in connection therewith by the following analysis of this invention.

This invention accordingly also consists in the features of construction, combinations of parts, and in the unique relationship of the members and in the relative proportioning and disposition thereof, all as more completely outlined in the following specification and in said drawings.

To enable others skilled in the art so fully to comprehend the underlying features of my invention that they may embody the same by numerous modifications in structure and relationship of parts contemplated by this invention, drawings depicting a preferred form have been annexed as a part of this disclosure, and in such drawings like characters of reference denote corresponding parts throughout all the views, of which:—

Fig. 1 is a plan view of a fur cutting machine embodying my invention;

Fig. 2 is a central vertical section through said machine on the line 2—2 of Fig. 1;

Fig. 3 is an enlarged section of the suction zone over which the conveyor belt travels;

Fig. 4 is a plan of the apron or conveyor belt shown in Fig. 1 with a part of the said belt and rollers at the suction zone cut away to show the construction of the device at such zone; and Fig. 5 is a cross-section of my invention as applied to an unhairing machine.

Referring now to these drawings, 1 indicates a shaft mounted in bearing brackets 2 supported on side beams 3 mounted on a frame 4 having legs 5. The shaft 1 carries a sleeve 6 and a series of shearing cutters or knives 7 adapted for cooperation with a stationary vertical blade 8 to continuously shear or cut fur from a hide or skin which is caused to come into the shearing zone as hereinafter described. The shearing mechanism above described is preferably enclosed in a suction casing 9 having, as shown, a conduit 10 communicating with another conduit 11 connected with any suitable means (not shown) for creating a suction therein. Said suction chamber has just above the blade 8 an opening or slot 15 adapted to permit the fur of the skins to extend therethrough and into the path of the cutters. The suction in such casing 9 is adapted to cause the hair or fur on a skin to be raised perpendicularly to the skin when the skin is brought into proximity to said slot and into the shearing zone of the cutters. The suction in the casing also causes the hair or fur severed by the cutters from the skins to be removed from the casing and away from the path of the cutters and deposits such severed hair in a suitable receptacle not shown.

Suitable means for adjusting the relative positions of the shaft 1 and cooperating blade 8 are provided and, as illustrated, the support 32 for the blade 8 is mounted between the blocks 12 slidable in ways 13 in the side beams 3, and the slidable blocks 12 are moved to enable adjustment between the cutters 7 and blade 8 by means of adjusting screws 14.

The above is one conventional form of fur treating or shearing mechanism with which my improved feeding devices hereinafter referred to cooperates, my invention dealing more particularly with the means for moving or feeding the fur skins into the shearing or treating zone.

For the purpose of so feeding the skins through the treating or shearing zone, I provide a conveyor belt 18 which has a portion moving adjacent to said treating zone so that the fur or hair of the skins will extend into the same and means cooperating therewith for automatically and firmly attaching the under surface of the skins to the said belt as it approaches and passes the shearing or treating zone and then automatically releases the skins after treatment on the return movement of said conveyor belt so as to permit said skins to be delivered by gravity to the front of the machine. For this purpose, a suction casing 16 is preferably disposed, as shown, in an inclined position at one side of said shearing or treating zone, the upper side 17 of which casing forms a feeding table and the conveyor belt 18 is arranged to travel in contact with the upper surface 17 of said casing and to carry the skins from the front of the machine forwardly into the operating zone where the same is, in the embodiment shown, suitably cut and then turned around in an arc and moved backwardly toward the front of the machine. The upper side of the suction box 16 is provided, adjacent and parallel to the side edges of the aperture 15 in the casing 9, with a suction slot 19; the edge thereof is provided with a stationary U-shaped and perforated guiding bar 24 also disposed parallel to the side edges of the slot 15, and the bottom of the box has another similarly-disposed slot 22, said suction slots and apertures in the bar forming a continuous and uninterrupted suction area extending in opposite directions and also around the bent front edge of the box. The belt 18 which is porous is driven from the front end of the machine by means of a roller 20 mounted on a shaft $20^a$ which is in turn driven by a pulley $20^b$ from any suitable source of power not shown, the said shaft and roller being supported by a bracket 21 which is in turn supported on the side beams 3. The said belt travels from the roller 20 forwardly over the upper surface 17 of the box 16 and over the suction slot 19 therein, thence around the said perforated guiding bar 24 and thence in contact with a portion of the bottom of the suction box and over the slot 22 therein, and thence further back beneath the roller 20 at the front side of the machine. The bar 24 is braced and the box 16 is divided into two independent suction chambers by a suitable partition 24ª located horizontally within the box 16 and extending from the rear end to the front thereof. Rollers 27 are provided at opposite sides of the guiding bar 24 which is preferably of less width than the aforesaid porous belt and as shown these rollers are mounted upon shafts 28 which are journalled at one end in brackets 29 forming extensions of the bracket 21 and at their opposite end in the opposite ends of the guiding bar 24. As the belt is, as aforesaid, of greater width than the bar 24, the marginal edges thereof will pass over the rollers 27 which will assist in moving of the belt around the guide bar 24.

It will be obvious that when the porous belt 18 which is preferably formed of a metallic chain mesh, is passed over the suction slots at the upper side of the box and over the perforated bar 24, a fur skin mounted upon said travelling belt will be gripped and held in close contact with said belt through the action of the suction as it approaches the bar 24 and will be held in contact with the belt during its travel over the bar 24 and will also be held in contact with the said belt during its travel beneath the box and over the slot 22 in the bottom thereof, and furthermore that after the belt has passed beyond the zone of said slot 22 the skin will be automatically released. The skin will thereupon fall by gravity upon an inclined slide or chute 30 which will conduct the same to the front of the machine or into a suitable receptacle therefor. This chute 30 is, as shown, supported in inclined position by means of a bracket 31 secured to an adjustable support 32 for the blade 8.

Vacuum may be produced in any suitable manner in the chambers of the box 16 and as shown said box has side openings 25 connected to the main suction conduit 11 by the side conduits or pipes 26,—the degree of vacuum produced in the chambers is controlled by dampers 26ª. The sizes of the suction slots 19 and 22 are also preferably variable by means of slides 19ª and 22ª which are respectively movable by the operating rods 19ᵇ and 22ᵇ so as to enable the variation of the degree of suction through the slots in accordance with requirements.

It sometimes happens that when the rear end of a skin has travelled over the slot 19 so as to leave the same uncovered, the sudden variation in pressure releases the tail end of the skin and causes it to be projected against the cutters and destroyed, and in order to obviate this, I mount between said slot 19 and the entrance slot 15 and in operative relationship to the belt 18 a hold down roller 18ª which retains the skin in contact with the conveyor belt and prevents the destruction of the tail end of the skin as aforesaid.

The belt and its supporting parts are preferably adjustable in the conventional manner toward and away from the slot 15 so as to enable greater or less lengths of hair to be severed from the skins which are being operated upon, and for this purpose I have caused the shaft 20ª to be mounted in a block 33 sliding in ways 33ª and adjustably movable in said ways by means of a screw 34.

In order to permit such adjustment the bracket 21 is connected to the beams 3 by means of a slot 36 and bolt 37 and I preferably provide adjacent to the bolt 37 a scale 35 for determining the extent of movement of the conveyor belt and supporting parts.

In Fig. 5 I have illustrated diagrammatically a modified form of my invention comprising an unhairing machine in which my invention is adapted to be used. In this figure, 40 indicates a conveyor belt which is driven by rollers 41—42, passes beneath a roller 43 and travels upwardly and downwardly around a suction box 44. The box 44 has a suction slot 46 at one side thereof, a perforated bar 47 at the upper edge thereof and a second suction slot 48 at its opposite side. The air is exhausted from the box through the conduit 49 leading to any suitable source of suction not shown. The conveyor belt in this construction is, of course, also porous and a skin carried thereby will be automatically held in contact therewith during its movement through the zone of operation of the brushes 50—51 and of the unhairing or cutting elements 52—53, and furthermore will be automatically released from attachment to said belt in the receding or return travel of the belt after passing through the zone of operation of the unhairing mechanism.

Having described my invention, I claim:—

1. In combination with a suitable fur-treating mechanism, of a porous conveyor belt adapted to travel in one plane into a position adjacent to said treating mechanism and to change its direction of travel to a different plane away from the same and to carry a skin thereon, of suction means arranged to cause a continuous and uninterrupted suction on the under surface of a skin through the said belt during its travel through the operating zone of said mechanism.

2. In combination with a suitable fur-treating mechanism, of a porous conveyor belt adapted to carry a skin, a suction box having a bent portion at its front edge disposed contiguous to the operating zone of said mechanism and over which the belt travels, said box having a suction slot in its upper surface, a series of perforations in its front edge and a suction slot in its lower surface, said slots and perforations being arranged to form continuous and uninterrupted suction openings around said bent front edge and means for creating suction within the box whereby the under surface of a skin will be automatically attached by such suction to the said belt during its forward travel through and around the bent front edge of said box and will be automatically released on the return movement of said belt after movement through said zone.

3. In combination with a suitable fur-treating mechanism, of a porous conveyor belt adapted to carry a skin, a suction box disposed adjacent to the operating zone of said mechanism and over which the belt travels, said box having a slot in its upper surface, a series of perforations in its front edge and a suction slot in its lower surface, means for creating suction within the box, a driving roller for said belt at one end of its travel, and marginal rollers at opposite sides of the front edge of said box for guiding the said belt at the opposite end of its travel, whereby the under surface of a skin will be automatically attached by such suction to the said belt during its forward travel through and around said box and will be automatically released on the return movement of said belt after movement through said zone.

4. In combination with a suitable fur-treating mechanism, of a porous conveyor belt adapted to carry a skin, a suction box disposed adjacent to the operating zone of said mechanism and over which the belt travels, said box having a slot in its upper surface, a series of perforations in its front edge and a suction slot in its lower surface, means for creating suction within the box whereby the under surface of a skin will be automatically attached by such suction to the said belt during its forward travel through and around said box and will be automatically released on the return movement of said belt after movement through said zone and means for automatically delivering the skin to the front of the machine after the same is released by the travel of said belt over the suction apertures.

5. The combination with a suitable fur-treating mechanism, of a porous conveyor belt, a suction box substantially triangular in longitudinal cross-section over which the said belt travels, said box having a rounded apical front edge and also being provided with suction slots at opposite sides of said rounded front edge and perforations around said rounded front edge to provide a continuous and uninterrupted suction area; and means for producing a partial vacuum within said box whereby skins conveyed by the said belt over said box will be automatically attached at one side of said rounded front edge and will be bent around and retained in attachment with the belt during its travel over said front edge and will also be attached for part of the distance of their travel on the opposite side of said front edge.

6. The combination with a suitable fur treating mechanism, of a porous conveyor belt adapted to carry a skin, a suction box on the opposite surfaces of which said belt travels in opposite directions, said box being provided with substantially flat surfaces at opposite sides of the axis thereof and having a connecting bent portion at its front edge disposed contiguous to the operating zone of said fur-treating mechanism and around which said belt is bent, a partition within said box extending from the rear portion of said box to said bent front edge thereof and dividing the box into a plurality of parts each having a portion of said front edge, said box having at its said front edge on opposite sides of said partition suction apertures arranged to form continuous and uninterrupted suction openings around the said bent front edge, and means for creating suction within each of the said suction compartments.

7. The combination with a suitable fur treating mechanism, of a porous conveyor belt adapted to carry a skin, a suction box on the opposite surfaces of which said belt travels in opposite directions, said box being provided with substantially flat surfaces at opposite sides of the axis thereof and having a connecting bent portion at its front edge disposed contiguous to the operating zone of said fur-treating mechanism, and around which said belt is bent, said box having suction apertures at its front edge and also on one of two guiding surfaces on opposite sides of said front edge, said suction apertures being arranged to form continuous and uninterrupted suction openings around the said front edge, a centrally-disposed partition within said box extending from the front edge of the box to the rear thereof and dividing the box into independent and substantially equal top and bottom compartments, one of which compartments communicates with the portion of said suction apertures at the front edge of the box and the other with another portion of such apertures and means for creating suction within such compartments.

8. The combination with a suitable fur treating mechanism provided with a suction casing having a laterally extending fur-erecting suction aperture therein, of a suction box, a porous belt travelling forwardly and backwardly on opposite surfaces of said box and around said front edge, means for creating a partial vacuum within the box whereby the fur at the side edges of the skin may be released from the suction of the skin-attaching apertures and be subjected to the suction of the fur-erecting aperture of the casing and a hold-down member disposed parallel to and above said porous belt and having a portion arranged contiguous to said fur erecting suction aperture.

In witness whereof, I have signed my name to the foregoing specification in the presence of two subscribing witnesses.

WILLIAM A. WINTER.

Witnesses:
HELEN V. WHIDDEN,
FERDEN P. RANDOLPH.